(12) United States Patent
Rapp

(10) Patent No.: US 7,360,503 B2
(45) Date of Patent: *Apr. 22, 2008

(54) ATOMIZATION SYSTEM FOR ODOR AND ENVIRONMENTAL CONTROL IN LIVESTOCK HOLDING AREAS

(76) Inventor: Gary L. Rapp, R.R. #1, Box 177, Athens, IL (US) 62613

( * ) Notice: Subject to any disclaimer, the term of this patent is extended or adjusted under 35 U.S.C. 154(b) by 0 days.

This patent is subject to a terminal disclaimer.

(21) Appl. No.: 11/311,863

(22) Filed: Dec. 19, 2005

(65) Prior Publication Data

US 2006/0096549 A1 May 11, 2006

Related U.S. Application Data

(63) Continuation of application No. 10/292,556, filed on Nov. 12, 2002, now Pat. No. 6,997,139.

(60) Provisional application No. 60/354,677, filed on Feb. 5, 2002.

(51) Int. Cl.
*A01K 1/00* (2006.01)

(52) U.S. Cl. ........................................ 119/665; 119/447

(58) Field of Classification Search ................ 119/447, 119/458, 665; 239/3, 462
See application file for complete search history.

(56) References Cited

U.S. PATENT DOCUMENTS

| 3,889,881 A | * | 6/1975 | Cunningham et al. | ......... 239/70 |
| 4,773,471 A | * | 9/1988 | Grant et al. | ................... 165/60 |
| 6,177,070 B1 | * | 1/2001 | Lynch | ........................ 424/76.1 |
| 6,302,161 B1 | * | 10/2001 | Heller et al. | ................... 141/9 |

\* cited by examiner

*Primary Examiner*—Kimberly S. Smith

(57) ABSTRACT

An atomization system for odor control in a livestock storage facility providing a quantity of odor control product in a reservoir holding an odor control product; a pump in communication with the reservoir; a circulation loop running throughout the livestock storage facility and communicating with the pump and the reservoir; and a plurality of atomization nozzles connected with the circulation loop for distribution of the odor control product onto surfaces of the storage facility and the livestock. The odor control product contains a mixture of vegetable oil, a natural acidic compound, alcohol, and water. Advantageously, the acidic compound in the odor control product is vinegar or concentrated citrus juice. A water supply line is also connected to the circulation loop through a water pump to provide a cooling mist throughout the facility.

19 Claims, 5 Drawing Sheets

ATOMIZATION SYSTEM FOR ODOR AND ENVIRONMENTAL CONTROL IN LIVESTOCK HOLDING AREAS

CROSS-REFERENCES

This application is a continuation of U.S. patent application Ser. No. 10/292,556 filed on Nov. 12, 2002 now U.S. Pat. No. 6,997,139.

TECHNICAL FIELD OF THE INVENTION

The present invention relates generally to raising livestock and, more particularly, to a system for minimizing the effects of odor and bacteria emanating from livestock waste on the surfaces of a livestock holding area and for reducing the temperature of the holding area.

BACKGROUND OF THE INVENTION

Over the past decades there has been a shift from smaller localized family farms toward larger integrated confinement agricultural operations. Large agricultural operations typically utilize confinement barns to house a large number of livestock, such as swine. It is not uncommon for hog-confinement operations to be grouped in close proximity, forming "mega-farms" which may house tens of thousands of hogs. While these larger agricultural operations have numerous advantages, they also encounter significant pollution problems arising from the handling and treatment of manure and wastewater. Pollution problems associated with animal waste include nitrogen, phosphorus, solids, bacteria and foul odors that result from bacterial digestion.

Environmental concerns more specifically center on odor and water quality issues. Noxious gasses including ammonia, methane, hydrogen sulfide, fatty acids, and indoles may be emitted within the animal storage facilities. Odors emanating from confinement houses create a nuisance. In addition, the noxious gasses produced by animal waste create a potentially hazardous environment for humans working in animal storage facilities and the animals housed in such facilities.

The animal waste produced in these storage facilities can generally be separated into two categories: waste deposited by the animals directly into waste storage areas and waste deposited outside of the waste storage area onto other surfaces of the storage facility. While a few methods of addressing the odor caused by waste deposited directly into waste storage areas are known, the problem of controlling the odor and bacteria emanating from waste deposited onto the other surfaces of animal storage facilities has not been sufficiently addressed. Even in facilities where the waste storage areas are adequately treated in some manner to prevent the emission of noxious gasses, the waste remaining on the surfaces of the facility can be sufficient to produce an amount of noxious gasses and bacteria that is harmful to both livestock and humans.

Another air quality issue in animal storage facilities relates to the temperature of the air in the facilities. Livestock holding facilities are frequently subject to dangerously high temperature levels during warm weather months. These high temperatures adversely affect the health and comfort of the livestock in the facility, thereby impacting their growth. Controlling the temperatures in these facilities in an economical manner has proved to be a consistent dilemma over the years.

The present invention is directed to overcoming one or more of the problems set forth above.

SUMMARY OF THE INVENTION

An aspect of the present invention is to provide a system to treat the surface areas of an animal storage facility or holding area that may accumulate animal waste and thereby minimize the emission of odors and bacteria from the waste until it can be removed from the facility.

Another aspect of the present invention is to provide a system to enhance the overall environment of the storage facility and the general comfort and health of the livestock in the facility.

In accordance with the above aspects of the invention, there is provided an atomization system for odor control in a livestock storage facility that includes a reservoir capable of holding a sufficient quantity of an odor control product; a pump in communication with the reservoir; a circulation loop running throughout the livestock storage facility and communicating with the pump and the reservoir; and a plurality of atomization nozzles connected with the circulation loop for distribution of the odor control product onto surfaces of the storage facility and the livestock. The odor control product contains a mixture of vegetable oil, a natural acidic compound, alcohol, and water. The natural acidic compound is advantageously vinegar or concentrated citrus juice.

In another embodiment, a water supply line is also connected with the circulation loop through a water pump to provide a cooling mist throughout the facility.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
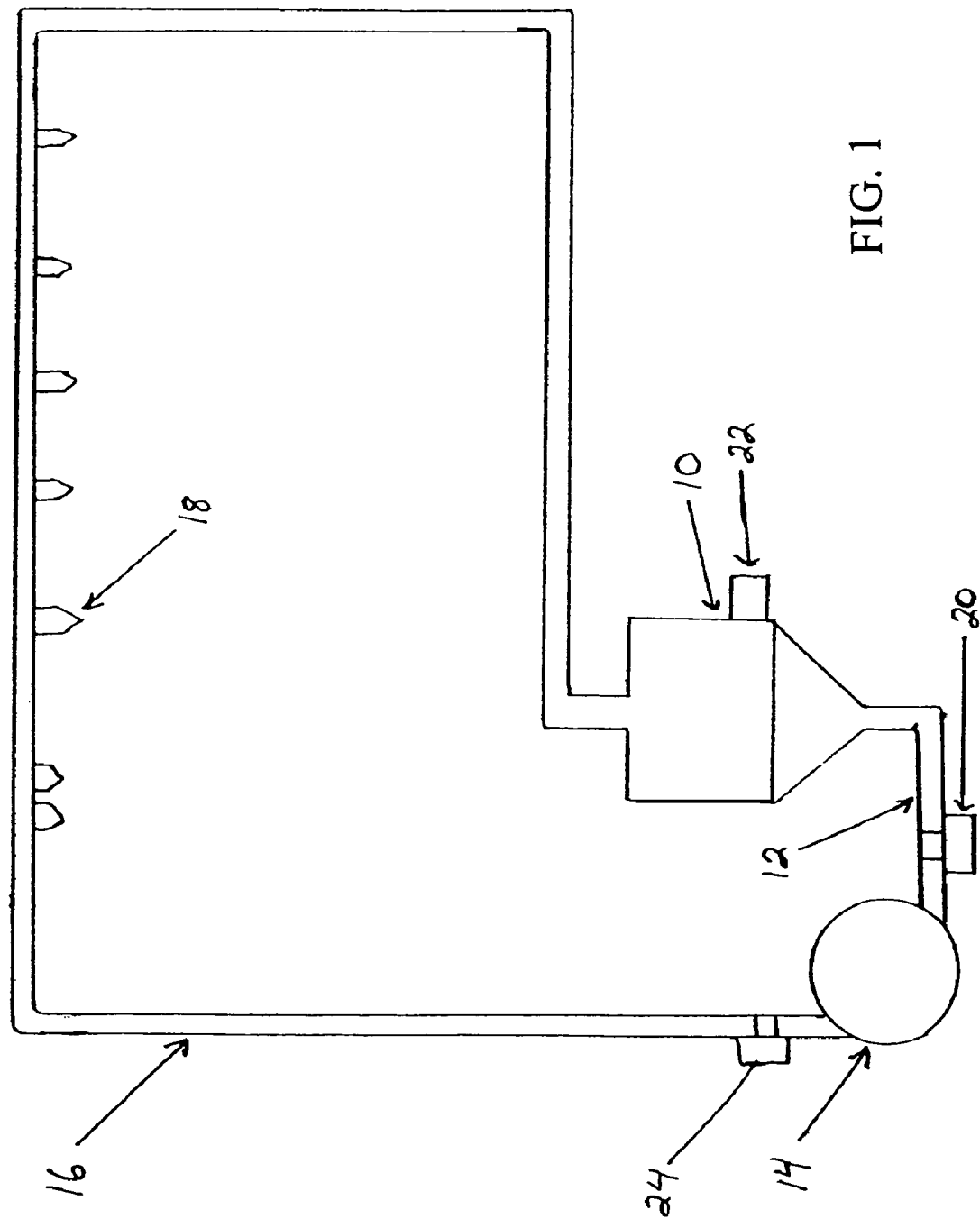
FIG. 1 is a schematic diagram of an atomization system according to an embodiment of the present invention.

A system embodying the present invention treats an animal storage facility to minimize the emission of noxious gasses and bacteria from animal waste deposited onto the surfaces of the facility. It has been found that atomizing a layer of oil over waste deposited onto surfaces reduces the level of ammonia ($NH_3$). In one test performed on waste collected from a swine production farm, an air sample was taken in a previously "clean" environment in which the waste had been placed. The air sample drawn with a syringe and test tube, and the level of ammonia was recorded. A level of 7.5 ppm was found in the initial sample. After the initial sampling, a spray bottle was used to atomize a fine mist of vegetable oil over the waste. A second air sample was taken, resulting in a reading of 0 ppm of ammonia. A second test was performed in a swine holding area in which the waste storage pit had already been sufficiently treated to minimize the emission of gasses and odors directly from the pit. An initial air sample taken from the area resulted in a reading of 5 ppm of ammonia. A portable pump sprayer was then used to spray a mixture of vegetable oil and ethanol alcohol over the surfaces of the holding area. A second air sample resulted in a reading of 0 ppm of ammonia.

An odor control product in an embodiment of the atomization system is a mixture of vegetable oil, a natural acidic compound, alcohol, and water. In a preferred embodiment of the system, the following percentages of the four ingredients are used to formulate the odor control product:

| Vegetable Oil | approximately 43.5% |
| Water | approximately 43.5% |
| Alcohol | approximately 9% |
| Natural Acidic Compound | approximately 4% |

These percentages are approximate and reasonable variations therefrom are acceptable. Particularly good results have been achieved using a formula of 43.478% vegetable oil, 43.478% water, 8.696% alcohol, and 4.348% natural acidic compound.

As described above, vegetable oil provides a seal over the surface waste to minimize gasses emanating from the waste. The vegetable oil also serves to reduce dandruff and feed dust suspended in the air within a storage facility. The vegetable oil, in addition to its other roles, serves as a barrier between the animals and the alcohol. In a preferred embodiment of the system, the odor control product utilizes corn oil. The natural acidic compound in the odor control product reacts with ammonia present in the air of the facility in an acid-base reaction, thereby reducing the level of ammonia in the air. In the preferred embodiment of the atomization system, the natural acidic compound used in the odor control product is concentrated citrus juice, and advantageously, concentrated lemon juice. In an alternate embodiment, vinegar is used in place of concentrated citrus juice. The alcohol serves both as a disinfectant by destroying bacteria in the air and on the surfaces of the facility and as an antifreeze to prevent the product from freezing in the system. In the preferred embodiment of the atomization system, ethanol alcohol is used. Water is added to the product to further dilute the vegetable oil, decreasing the oil's viscosity and aiding atomization of the product. In the preferred embodiment, distilled water is used in the odor control product. In a particularly advantageous embodiment, the odor control product is blended and then passed through a filter which removes particles larger than one micron (1μ) in size. This minimizes the occurrence of clogged nozzles in the atomization system described below.

FIG. 1 illustrates one embodiment of the atomization system. The atomization equipment includes a reservoir or tank 10 to store the odor control product. The reservoir 10 is connected with a pump 14 by a connecting line 12. A circulation loop 16 extends throughout the facility. The inlet end of the circulation loop 16 is connected with the outlet of the pump 14, while the outlet end of the circulation loop 16 is connected with the reservoir 10. In a preferred embodiment, the reservoir 10, pump 14, connecting line 12 and circulation loop 16 are arranged in a closed loop to prevent dust particles or other foreign matter from contaminating the odor control product. A plurality of atomization nozzles 18 are connected with the circulation loop 16 and directed at the various areas and surfaces within the facility. Advantageously, the atomization nozzles are spaced approximately 10 feet apart.

Advantageously, the pump 14 is capable of generating 250 psi and is manufactured from stainless steel. In this embodiment, the pump is powered by a 2 hp, single or three-phase motor and is rated for 590 gallons per hour at 260 psi continuous output of flow. Furthermore, the pump 14 is mounted as close as possible to the tank 10. In another embodiment, the connecting line 12 is equipped with a flow sensor 20 to detect when the flow of odor control product from the reservoir 10 slows, indicating a low level of remaining product. In another embodiment, this same function is served by a level sensor 22 in the reservoir 10. In yet another embodiment, an oil filter 24 is connected to the discharge side of the pump 14 to remove any particles that could plug the atomization nozzles 18. However, the oil filter 24 is not required if the odor control product has been filtered after blending as described above.

In a preferred embodiment, the pump 14 is capable of generating pressures in the range of 180 psi to 250 psi. Application of the odor control product under pressure in this range results in superior odor and dust control within the livestock holding facility. It is theorized that applying the odor control product through the atomization system at these pressures induces an electrostatic charge on the particles of the odor control product as the product is atomized. The electrostatic charge is possibly induced as a result of the friction of caused by the flow of the oil in the product through the circulation loop and atomization nozzles and the pressure build-up experienced at the nozzles. The induction of an electrostatic charge in the system is particularly pronounced when the circulation loop is constructed from a plastic-based piping system, for example, a Schedule 80 PVC pipe. It is also possible that the electrostatic charge occurs as a result of acceleration of the particles of the product in accord with principles of electro-gas dynamics. This electrostatic charge in the particles of the odor control product attracts dust particles present in the air of the livestock storage facility, thereby clearing the air of these dust particles.

Figure 2:
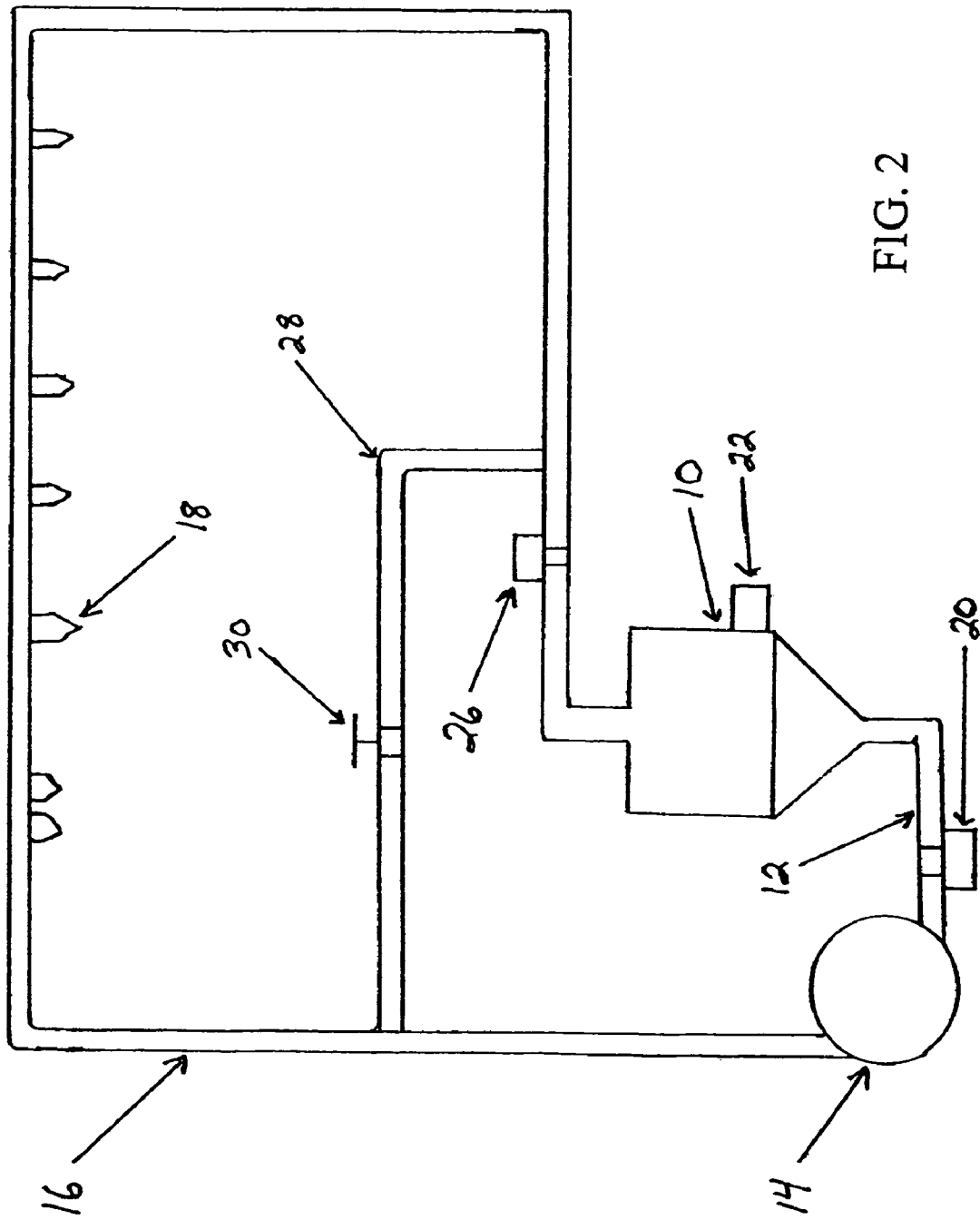
FIG. 2 is a schematic diagram of an atomization system incorporating a bypass loop according to another embodiment.

In FIG. 2, a bypass loop is included in the system. An actuated ball valve 26 is inserted in the circulation loop 16 before its connection with the reservoir 10. A bypass line 28 extends from an area of the circulation loop 16 prior to the actuated ball valve 26 to an area of the circulation loop 16 coming out of the pump outlet. A check valve 30 is inserted into the bypass line 28 to prevent backflow of the odor control product.

In operation, the actuated ball valve 26 is closed to separate the circulation loop 16 from the reservoir 10 immediately after a mixing period. While mixing periods are adjustable, a four minute mixing period prior to atomization allows the components of the odor control product to become fully suspended. The bypass loop reduces line pressure during mixing periods immediately preceding atomization. While the ball valve 26 is closing, the pump 14 is shut down. Once the ball valve 26 is closed, the pump 14 is reactivated to atomize the odor control product. In a preferred application of the system, the odor control product is atomized for a period of approximately 35-40 seconds. After atomization, the pump 14 is shut down once more. The ball valve 26 then reopens and any surplus odor control product is returned to the reservoir 10.

In hog facilities, the atomization system is usually operated once every 24 hours. The preferred time of day for application is approximately 3:00 a.m. The air movement in the facility is generally calmest at this time, resulting in reduced drift of the odor control product out of the facility. In poultry facilities, more frequent atomization is appropriate. A preferred atomization schedule for poultry would be four applications lasting approximately 15 seconds each.

Figure 5:
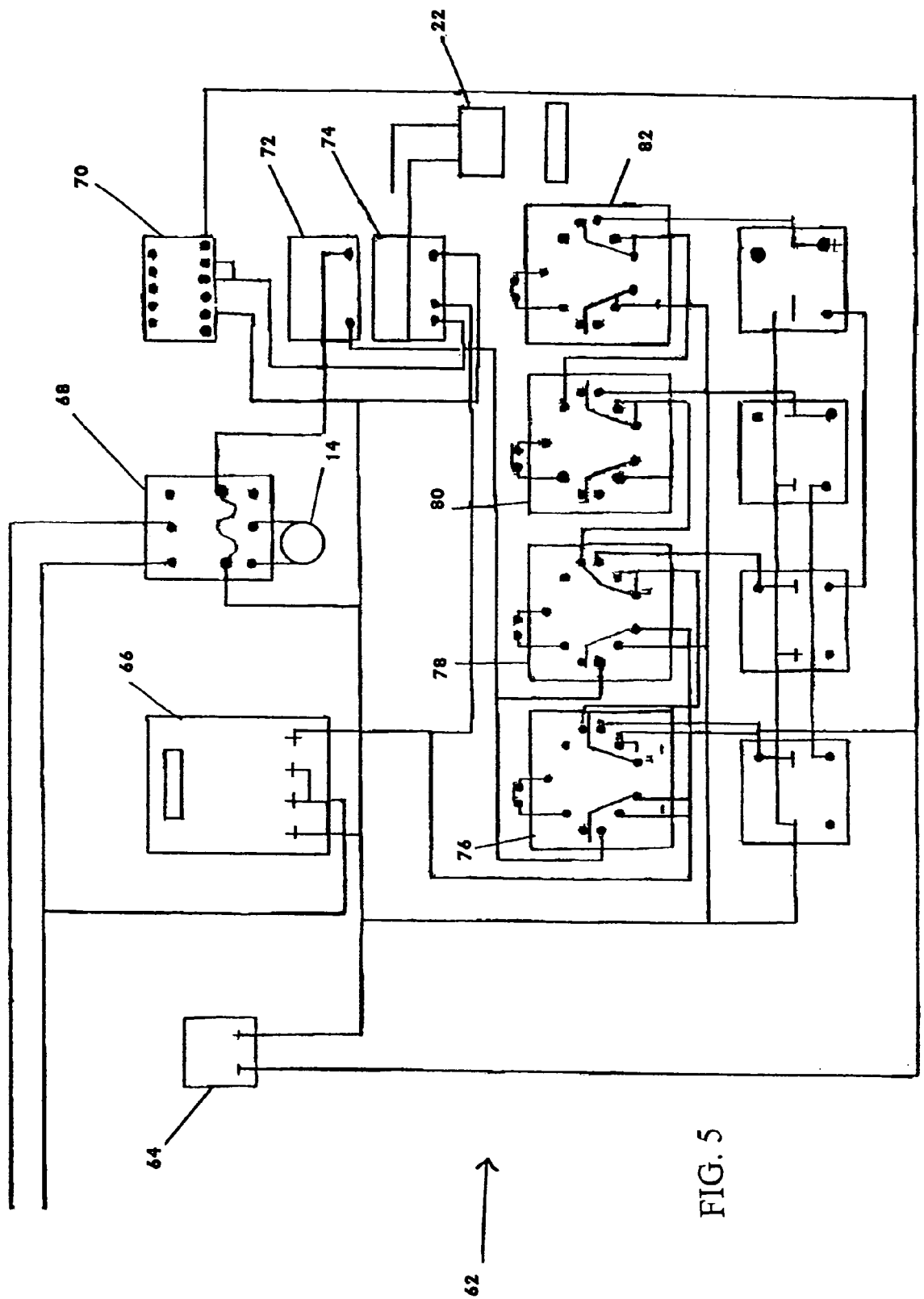
FIG. 5 is a schematic diagram of a controller usable with the embodiments of FIGS. 1-3.

Advantageously, the above-described operation is automated through a controller 62 associated with the atomization system as illustrated in FIG. 5. The controller includes a counter 64, which counts the number of times the atomization system has been activated in a 24 hour period, a 24-hour timer 66, a motor relay 68 which controls operation of the pump 14, a power relay 70 which is controlled by the flow sensor 20 or level sensor 22, an on-delay relay 72 which delays the activation of the pump 14, an off-delay relay 74 which allows five minutes of operation of the system after the liquid level in the reservoir 10 drops sufficiently to trigger the flow sensor 20 or level sensor 22, a mixing valve relay 76 which opens valve 26 to allow mixing of the odor control product prior to atomization, an atomizing valve relay 78 which closes valve 26 to allow the odor control product to flow through the circulation loop and be atomized, a drain valve relay 80 which reopens valve 26 to allow any odor control product remaining in the circulation loop to drain back to the reservoir 10, and a close valve relay 82 to close valve 26 at the end of the cycle.

Figure 3:
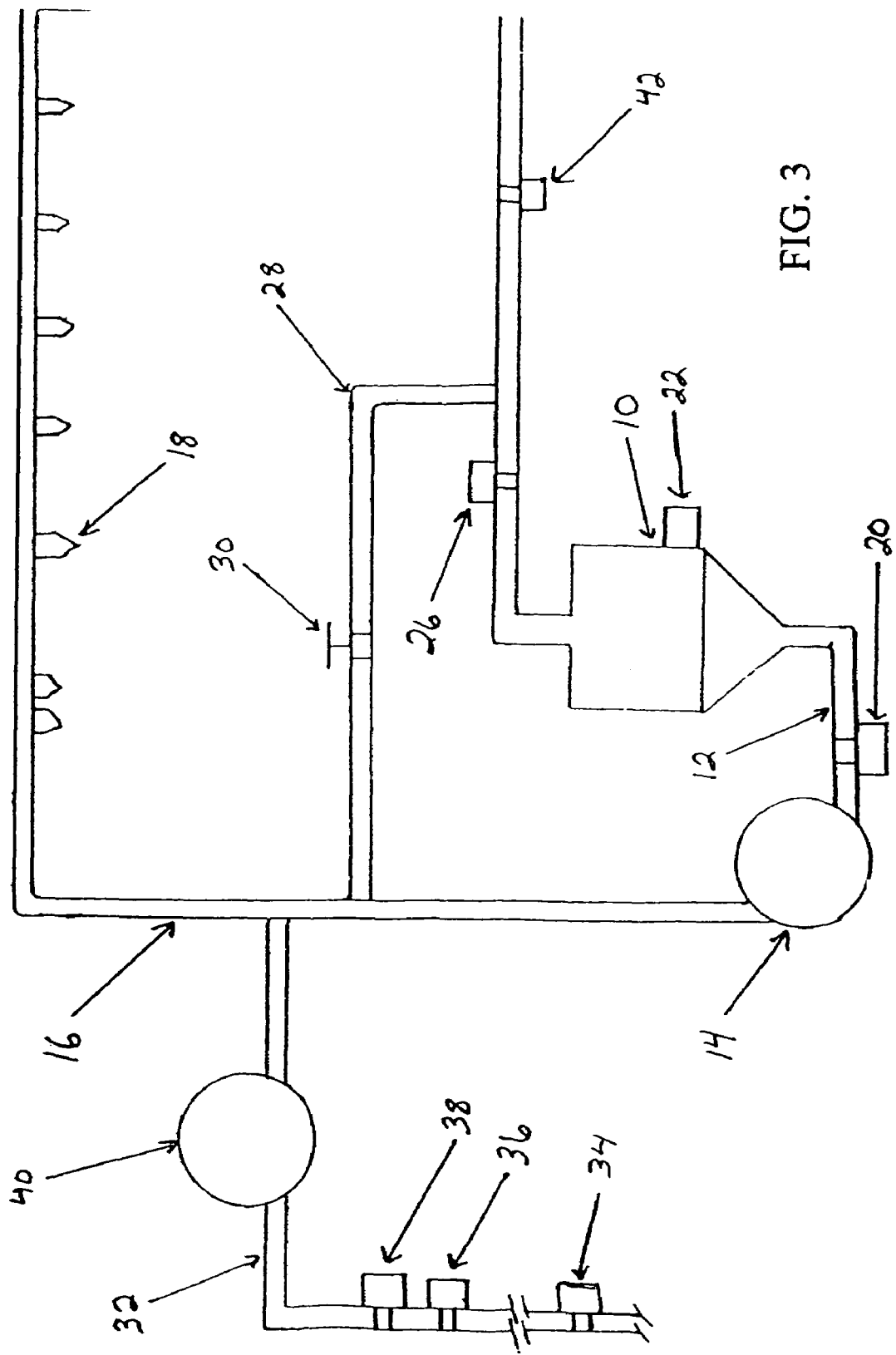
FIG. 3 is a schematic diagram of an atomization system incorporating a cooling system according to another embodiment.

FIG. 3 illustrates a cooling system that is also incorporated into the atomization system. A water supply line 32 is connected with the circulation loop 16. A back flow preventer 34 is installed in the water supply line 32. At least one water filter 36 and a float assembly 38 are installed in the water supply line 32. If the float assembly 38 is not activated by water pressure, the system shuts down. The water supply line 32 is then connected to the inlet of a water pump 40. The water pump 40 is preferably a ¾ hp carbonator brass pump capable of generating 250 psi. The outlet of the water pump 40 is then connected to the circulation loop 16.

To minimize drips in the system, a dump valve 42 is installed into the circulation loop 16, which allows all water pressure to be discharged at the end of an atomization period.

Figure 4:
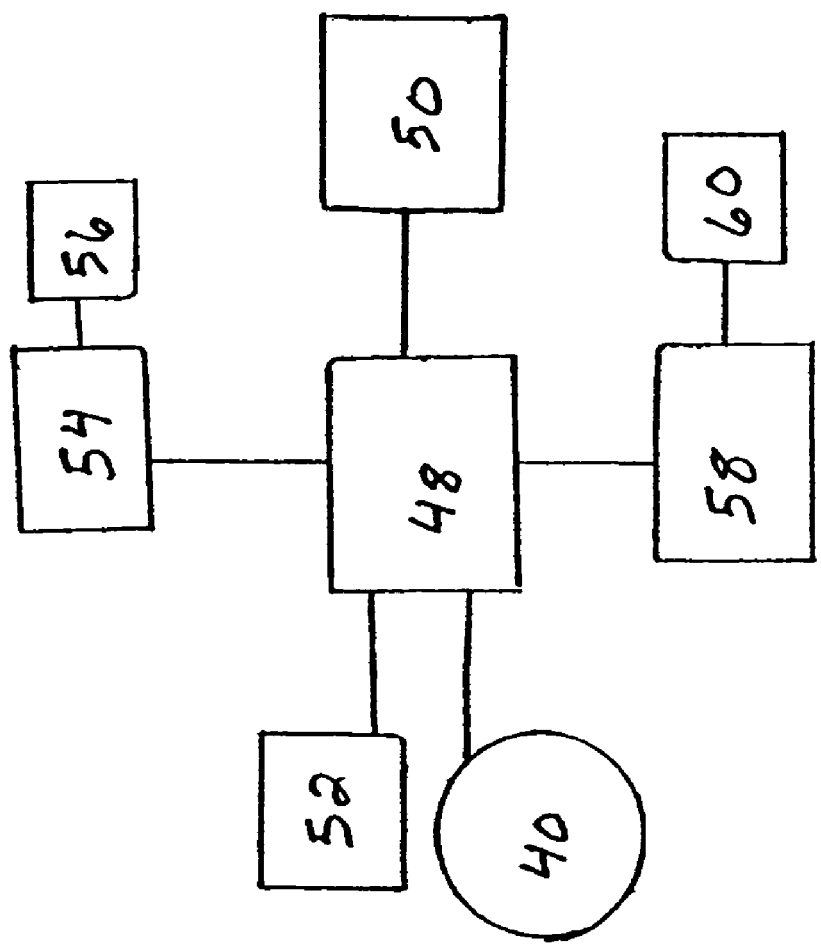
FIG. 4 is a control diagram of a computer controlled atomization system usable with the embodiment of FIG. 3.

In a preferred embodiment of the cooling system, a computer 48 controls the operation of the water pump 40, as shown in FIG. 4. The computer 48 also controls a number of fans 50 located in the facility. The atomization cooling system provides a cooling mist to the livestock housed in the facility while maintaining a dry floor in the facility. The fans 50 incorporated into the system encourage evaporation, thereby further cooling the livestock. The computer 48 automatically adjusts the level of cooling provided by the fans 50 or atomization cooling system. The lower cooling levels depend on the different speeds of the fans 50 for cooling. The higher cooling levels incorporate the atomization cooling system. When utilizing the atomization cooling system, the computer 48 controls the system by cycling the water pump 40 on and off. The length of the cooling period during which the water pump 40 is operated is adjustable.

In another embodiment of the cooling system, a pressure sensor 52 is incorporated into the circulation loop 16. If the sensor 52 indicates a lack of water pressure when the computer 48 attempts to turn on the cooling system, a back-up sprinkler system (shown generally as 54), which is operated with normal water pressure, is activated, thereby ensuring that the livestock housed in the facility are kept cool. A thermostat 56 incorporated into the back-up system 54 shuts that system down should the temperature in the facility reach the desired norm.

In the event of a power failure, the system will reset itself. An alarm 58 is also incorporated into the system that is activated for the following conditions: no water, no water pressure in the circulation loop, or no electrical power. If an operator does not respond to the alarm 58 within a specified period of time, the system automatically dials an emergency number to summon assistance. In the event of a power failure, a power inverter 60 provides an electrical supply for the alarm 58.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. An atomization system for odor control in a livestock storage facility, including:
   a reservoir capable of holding a sufficient quantity of an odor control product, wherein the odor control product includes a mixture of a vegetable oil, a natural acidic compound, alcohol, and water; a pump in communication with the reservoir;
   a circulation loop running throughout the livestock storage facility and communicating with the pump and the reservoir;
   a plurality of atomization nozzles connected with the circulation loop for distribution of the odor control product onto surfaces of the storage facility and the livestock;
   a bypass loop having: a ball valve inserted into the circulation loop prior to a connection between the circulation loop and the reservoir;
   a bypass line connected with a first area of the circulation loop prior to the ball valve and extending to a second area of the circulation loop near the connection of the circulation loop with and subsequent to the pump;
   a check valve in the bypass line; and
   wherein the ball valve is closed to separate the circulation loop from the reservoir.

2. An atomization system for odor control in a livestock storage facility as set forth in claim 1, wherein the vegetable oil in the odor control product is corn oil.

3. An atomization system for odor control in a livestock storage facility as set forth in claim 1, wherein the natural acidic compound in the odor control product is vinegar.

4. An atomization system for odor control in a livestock storage facility as set forth in claim 1, wherein the natural acidic compound in the odor control product is concentrated citrus juice.

5. An atomization system for odor control in a livestock storage facility as set forth in claim 4, wherein the concentrated citrus juice is lemon juice.

6. An atomization system for odor control in a livestock storage facility as set forth in claim 1, wherein the water in the odor control product is distilled water.

7. An atomization system for odor control in a livestock storage facility as set forth in claim 1, wherein the alcohol in the odor control product is ethanol alcohol.

8. An atomization system for odor control in a livestock storage facility as set forth in claim 1, wherein the odor control product is filtered to remove particles larger than approximately one micron in size.

9. An atomization system for odor control in a livestock storage facility as set forth in claim 1, wherein the atomization nozzles are connected with the circulation loop in a pattern in which the nozzles are spaced approximately ten feet from one another.

10. An atomization system for odor control in a livestock storage facility as set forth in claim 1, further including a connecting line connecting the pump with the reservoir and means for detecting flow of the odor control product from the reservoir to the pump through the connecting line.

11. An atomization system for odor control in a livestock storage facility as set forth in claim 10, wherein the means for detecting flow of the odor control product is a flow sensor associated with the connecting line.

12. An atomization system for odor control in a livestock storage facility as set forth in claim 10, wherein the means for detecting flow of the odor control product is a level sensor located in the reservoir.

13. An atomization system for odor control in a livestock storage facility as set forth in claim 1, wherein the pump is capable of producing pressures between approximately 180 psi and approximately 250 psi.

14. An atomization system for odor control in a livestock storage facility as set forth in claim 1, wherein the circulation loop is constructed from plastic pipe and an electrostatic charge is induced on particles of the odor control product.

15. An atomization system for odor control in a livestock storage facility as set forth in claim 14, wherein the plastic pipe is a Schedule 80 PVC pipe.

16. An atomization system for odor control in a livestock storage facility as set forth in claim 1, further including a controller having a timer and a plurality of relays, whereby the operation of the atomization system is automatically controlled.

17. An atomization system for controlling the environment in a livestock storage facility, including:

a reservoir capable of holding a sufficient quantity of an odor control product, wherein the odor control product includes a mixture of a vegetable oil, a natural acidic compound, alcohol, and water;

a pump in communication with the reservoir;

a connecting line connecting the pump with the reservoir;

a circulation loop running throughout the livestock storage facility and communicating with the pump and the reservoir;

a plurality of atomization nozzles connected with the circulation loop for distribution of the odor control product onto surfaces of the storage facility and the livestock;

a bypass loop having: a ball valve inserted into the circulation loop prior to a connection between the circulation loop and the reservoir;

a bypass line connected with a first area of the circulation loop prior to the ball valve and extending to a second area of the circulation loop near the connection of the circulation loop with the pump;

a check valve in the bypass line; and wherein the ball valve is closed to separate the circulation loop from the reservoir;

a water pump connected with the circulation loop; and a water supply line connected with the water pump.

18. An atomization system for controlling the environment in a livestock storage facility as set forth in claim 17, further including: a plurality of fans throughout the livestock storage facility; a control unit in communication with the fans and the water pump, wherein the control unit cycles the fans and water pump on and off to control the temperature in the livestock storage facility.

19. An atomization system for controlling the environment in a livestock storage facility as set forth in claim 18, further including means for measuring the temperature and humidity in the livestock storage facility, said means for measuring communicating with the control unit, wherein the control unit cycles the fans and water pump on and off as a function of the temperature and humidity in the livestock storage facility.

* * * * *